United States Patent [19]
Iida et al.

[11] 4,045,766
[45] Aug. 30, 1977

[54] ULTRASONIC DETECTION SYSTEM

[75] Inventors: Masajiro Iida; Hideharu Morimatsu, both of Takarazuka; Itsuo Fukuoka; Yoshinari Yoshida, both of Nishinomiya, all of Japan

[73] Assignee: Furuno Electric Company, Limited, Japan

[21] Appl. No.: 651,182

[22] Filed: Jan. 21, 1976

[30] Foreign Application Priority Data

Jan. 30, 1975 Japan .................................. 50-13084

[51] Int. Cl.² ........................... G01S 9/66; G01S 7/62
[52] U.S. Cl. .................................... 340/1 R; 340/3 R; 340/6 R
[58] Field of Search ........................ 340/6 R, 1 R, 3 R

[56] References Cited

U.S. PATENT DOCUMENTS

| | | | |
|---|---|---|---|
| 3,781,776 | 12/1973 | Kuhn et al. | 340/6 R |
| 3,810,082 | 5/1974 | Arens | 340/6 R |
| 3,846,745 | 11/1974 | Hill et al. | 340/6 R |
| 3,946,355 | 3/1976 | Bertolino | 340/6 R |

Primary Examiner—Richard A. Farley
Attorney, Agent, or Firm—Eugene E. Geoffrey, Jr.

[57] ABSTRACT

An ultrasonic detection system which includes means for the transmission of signals in all directions, a circular array of transducers arranged at uniform intervals, means for producing output signals from spaced transducers and then sequentially combining outputs from sets of adjoining transducers to produce a plurality of received signals for display on indicating means.

3 Claims, 6 Drawing Figures

ULTRASONIC DETECTION SYSTEM

This invention relates to an ultrasonic detection system and more particularly to a system wherein an ultrasonic wave pulse is emitted throughout a wide angular range covering substantially a 360° angle and the reflected waves coming back from the respective directions are received and indicated simultaneously on a cathode ray tube.

Due to relatively low speed of propagation of ultrasonic waves, it is difficult to indicate the received waves on a cathode ray tube by means of PPI (plan position indication) scanning. According to a prior art system proposed for attaining the above object, an ultrasonic wave signal is emitted in all directions and reflected wave signals coming back from the respective directions are received by a plurality of ultrasonic transducers which are arranged circularly at equal intervals. In order to obtain a high directivity of reception, the outputs of several adjoining transducers are combined and the resultant signal is indicated on the cathode ray tube. If the train of the several transducers is shifted step by step to the circumferential direction, the received signals from all directions can be displayed at the same time.

However, the prior art system has encountered the following problems which are so serious that the system is seldom used in practice. Firstly, as understood from the above description, the number of circuits for composing or combining the outputs of transducers must be equal to the number of transducers. Moreover, it requires the same number of circuits for shifting the train of transducers by one turn. These requirements not only involve a relatively high cost but also affect simplicity and compactness of the system. Secondly, the system has a relatively large ineffective or undetectable range, as will be described later, and this fatal defect is enough to dissuade one from using the prior art system over a wide range. Thirdly, it has often suffered from substantial noise due to the switching pulses used for shifting the train of transducers.

Accordingly, an object of this invention is to provide an ultrasonic detection system having a reduced number of output circuits, a very narrow ineffective range and a large noise immunity.

The ultrasonic detection system of this invention comprises means for emitting an ultrasonic wave signal in all directions, a plurality of ultrasonic transducers arranged circularly at constant intervals for receiving said ultrasonic wave signal reflected back from said directions, a plurality of composite output circuits for combining the outputs of $k$ ($> 1$) transducers which are successively adjoining in a predetermined circumferential direction to produce a plurality of directive composite outputs, and means of deriving said composite outputs sequentially in time division fashion for indication. According to a feature of this invention, said ultrasonic transducers are classified into $m$ groups each consisting of $n$ transducers which are successively adjoining in said circumferential direction, the number of said composite output circuits are designated as $n$, where $m$ and $n$ are integers greater than one and $n$ is equal to or greater than $k$, $n$ switching circuits each having $m$ inputs connected respectively to the outputs of the j-th ($j = 1, 2, \ldots n$) transducers of said $m$ groups are connected to said composite output circuits such that $n$ groups of switching circuits each consisting of $k$ switching circuits which are circulatingly adjoining in said circumferential direction are coupled sequentially to said composite output circuits, and control means are provided for deriving $n$ outputs at a time from said switching circuits which are circulatingly adjoining in said circumferential direction and, at the same time, shifting said $n$ outputs one by one in said circumferential direction.

Other features and objects of this invention will be described in detail hereinunder with reference to the accompanying drawings.

Figure 1:
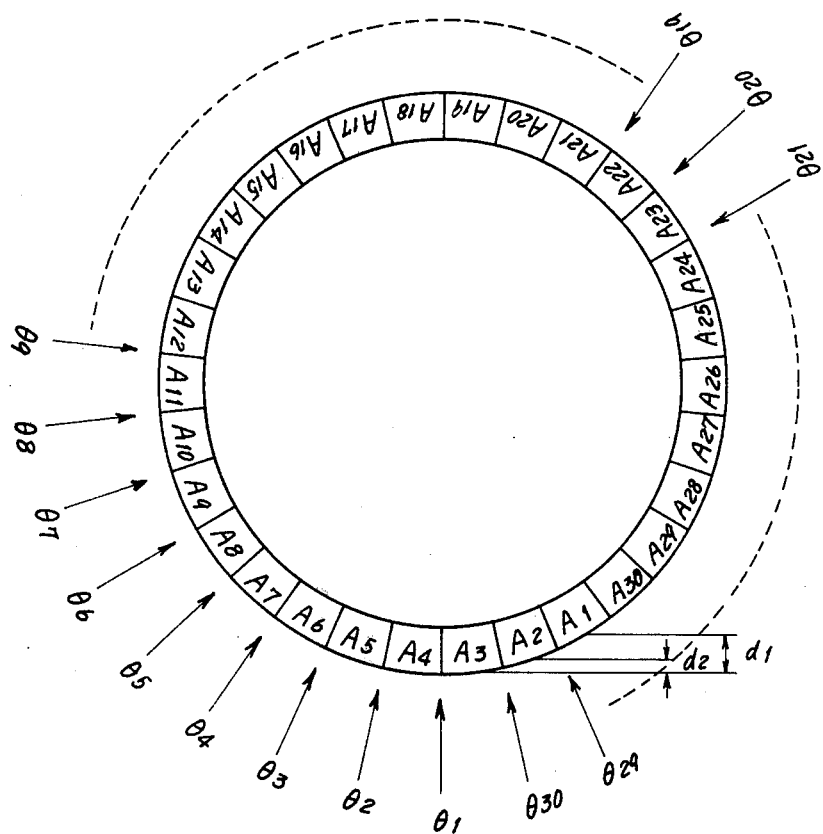
FIG. 1 is a schematic plan view of a transducer arrangement of this type of ultrasonic detection system.

In FIG. 1, as an example, thirty ultrasonic transducers $A_1, A_2, \ldots A_{30}$ are arranged circularly at equal intervals to receive ultrasonic wave signals reflected back from all peripheral directions. These transducers may be used also for ultrasonic transmission purposes, while a separate nondirective ultrasonic transducer may be installed exclusively for this purpose. The directivity of each transducer may not be too sharp so that some of the adjoining transducers are generally combined to form a sharp reception beam. For example, in the following description, the outputs of six transducers $A_1, A_2, \ldots A_6$ are combined to obtain a representative reception beam from the direction $\theta_1$. If the combination of transducers is switched or changed to $A_2, A_3, \ldots A_7$, the direction of the representative reception beam changes to the direction $\theta_2$. Accordingly, if the combination of six transducers is switched sequentially in a circumferential direction thirty times in this manner, the received signals from all directions are derived as the successive outputs of the transducer arrangement, which can be displayed on a cathode ray tube to indicate the objects as images having radial distances corresponding to the practical distances of the objects.

Figure 2:
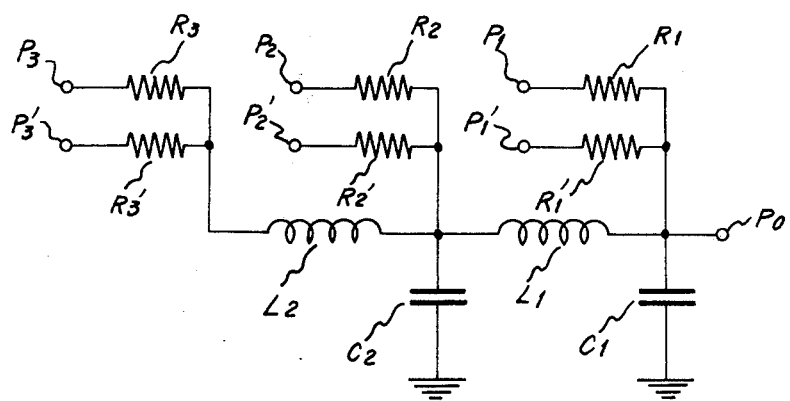
FIG. 2 is a circuit diagram representing an embodiment of the delay circuit used in this type of system.

FIG. 2 shows an example of the circuit for combining six transducer outputs. As shown in the drawing, the circuit includes six input terminals $P_1, P'_1, P_2, P'_2, P_3$, and $P'_3$ and a single output terminal $P_0$. The input terminals $P_1$ and $P'_1$ are connected through individual resistors $R_1$ and $R'_1$ to the output terminal $P_0$, the input terminals $P_2$ and $P'_2$ are connected through individual resistors $R_2$ and $R'_2$ and a common reactor $L_1$ to the output terminal $P_0$ and the input terminals $P_3$ and $P'_3$ are connected through individual resistors $R_3$ and $R'_3$ and a common reactor $L_2$ to the junction of the resistors $R_2$ and $R'_2$ and the reactor $L_1$. The output end of the reactor $L_1$ is grounded through a capacitor $C_1$ and the other end of the reactor $L_1$ is grounded through a capacitor $C_2$.

The signals applied to the terminals $P_1$ and $P'_1$ are directly derived from the output terminal $P_0$, while the signals applied to the terminals $P_2$ and $P'_2$ are derived from the output terminal $P_0$ with a delay determined by the elements $L_1$ and $C_1$ and the signals applied to the terminals $P_3$ and $P'_3$ are derived therefrom with an additional delay determined by the elements $L_2$ and $C_2$, with respect to the signals applied to the terminals $P_1$ and $P'_1$. When the outputs of the transducers $A_1$, $A_2$, $A_3$, $A_4$, $A_5$, and $A_6$ are respectively applied to the input terminals $P_1$, $P_2$, $P_3$, $P'_3$, $P'_2$ and $P'_1$ and the delay elements $L_1$, $C_1$, $L_2$, and $C_2$ are adequately selected so as to compensate the delayed arrivals of the ultrasonic wave at the transducers $A_1$ (and $A_6$) and $A_2$ (and $A_5$) with respect to the transducer $A_3$ (and $A_4$) due to the distance differences $d_1$ and $d_2$ of the transducers as shown in FIG. 1, only the ultrasonic wave signal coming back from the direction $\theta_1$ is derived from the output terminal $P_0$.

As easily understood, in the system of FIG. 1, however 30 circuits as shown in FIG. 2 and the same number of switching circuits are required for attaining a complete operation since there are 30 combinations of six transducers. This results in an expensive bulky device.

The delay time corresponding to the distance $d_1$ of FIG. 1 is calculated as about 22 microseconds when the diameter of the circular arrangement of the transducers is assumed as 50 centimeters. Therefore, at least a lapse of this delay time is required for deriving the received signal from the direction $\theta_1$ from the output terminal $P_0$. In addition to this delay time, in practice, the received signal pulse has members a relatively large leading-in or building-up time such as 100 to 200 microseconds. Accordingly, the total time required for complete reception of the reflected signal from the direction $\theta_1$ is estimated as about 120 to 220 microseconds. Assuming now the time required for deriving the received signal from a specific direction as 200 microseconds in consideration of the S/N ratio, the total time required for the thirty signal composing circuits as abovementioned with reference to FIG. 2 is 200 microseconds multiplied by 30 or 6000 microseconds, that is, 6 milliseconds. As the sound wave propagates about 9 meters in 6 milliseconds, the reflected wave from each direction includes the distance difference of 9 meters for round trip and, therefore, 4.5 meters for one way. This means that this system can detect only those objects existing at the 4.5 meter interval but cannot detect those existing midway of this interval. Such a system is of no use in practice.

Now, the improvement according to this invention will be described in conjunction with the above system having 30 ultrasonic receiving transducers $A_1$, $A_2$, . . . $A_{30}$ arranged circularly as shown in FIG. 1, with reference to the circuit diagrams shown in FIGS. 3A, 3B and 3C.

Figure 3A:
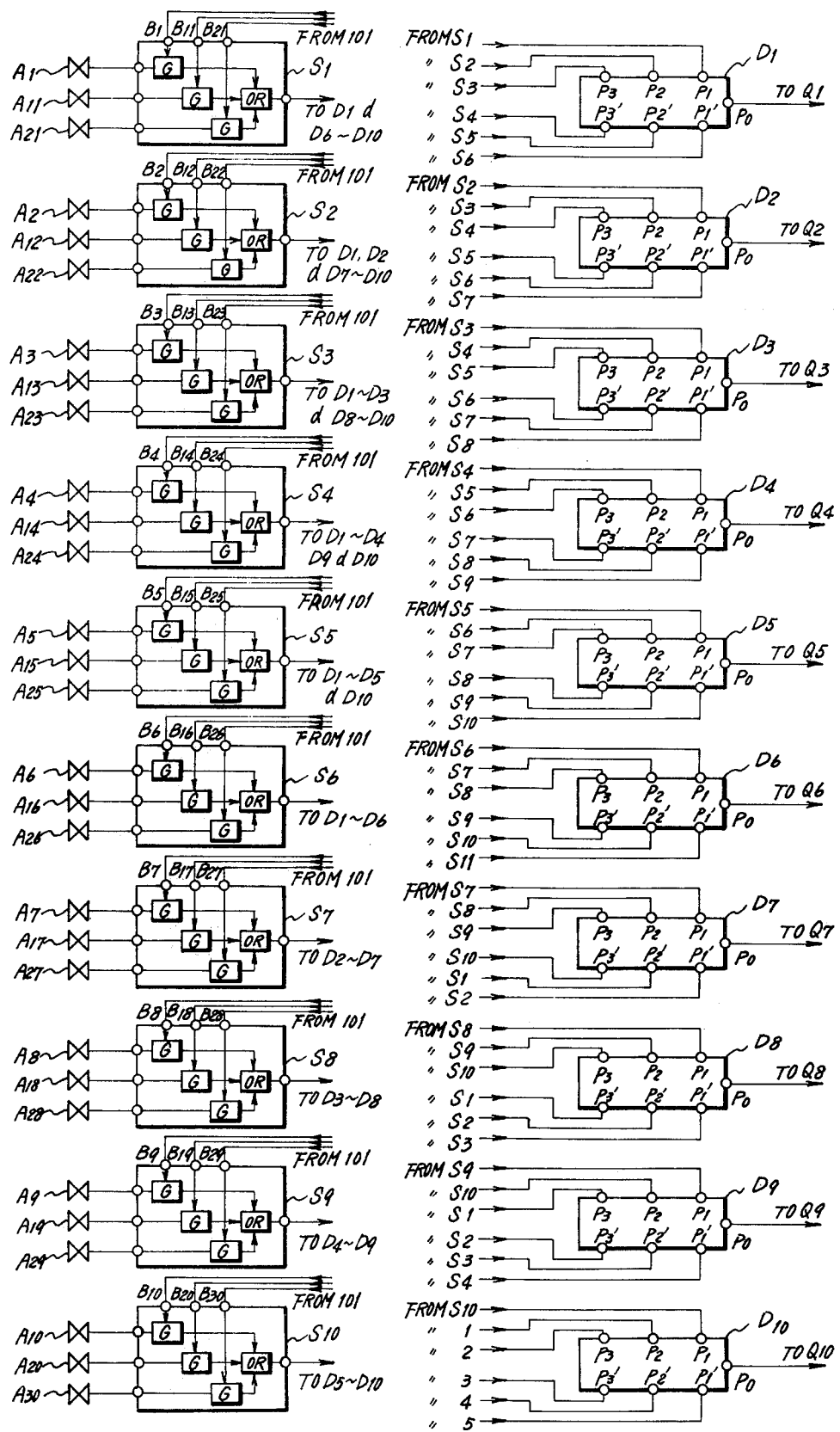
FIGS. 3A, 3B and 3C are three parts constituting a single block circuit diagram representing an embodiment of ultrasonic detection system according to this invention.

In the system according to this invention, the thirty (30) transducers are classified in 3 groups of ten (10) transducers each and connected respectively to 10 switching circuits $S_1$, $S_2$, . . . $S_{10}$ such that every 3 transducers located at 120 degree intervals are connected to the same switching circuit. More particularly, the transducers $A_1$, $A_{11}$ and $A_{21}$ are connected to the switching circuit $S_1$, the transducers $A_2$, $A_{12}$ and $A_{22}$ are connected to the switching circuit $S_2$, . . . and the transducers $A_{10}$, $A_{20}$ and $A_{30}$ are connected to the switching circuits $S_{10}$. Each switching circuit includes three gate circuits and one OR circuit arranged such that the three inputs from the corresponding three transducers are led through the respective gate circuits and the common OR circuit to the output terminal. The gate circuits are controlled by respective control inputs which are introduced into corresponding control terminals $B_1$, $B_2$, . . . $B_{30}$ as shown in FIG. 3A.

Figure 3B:
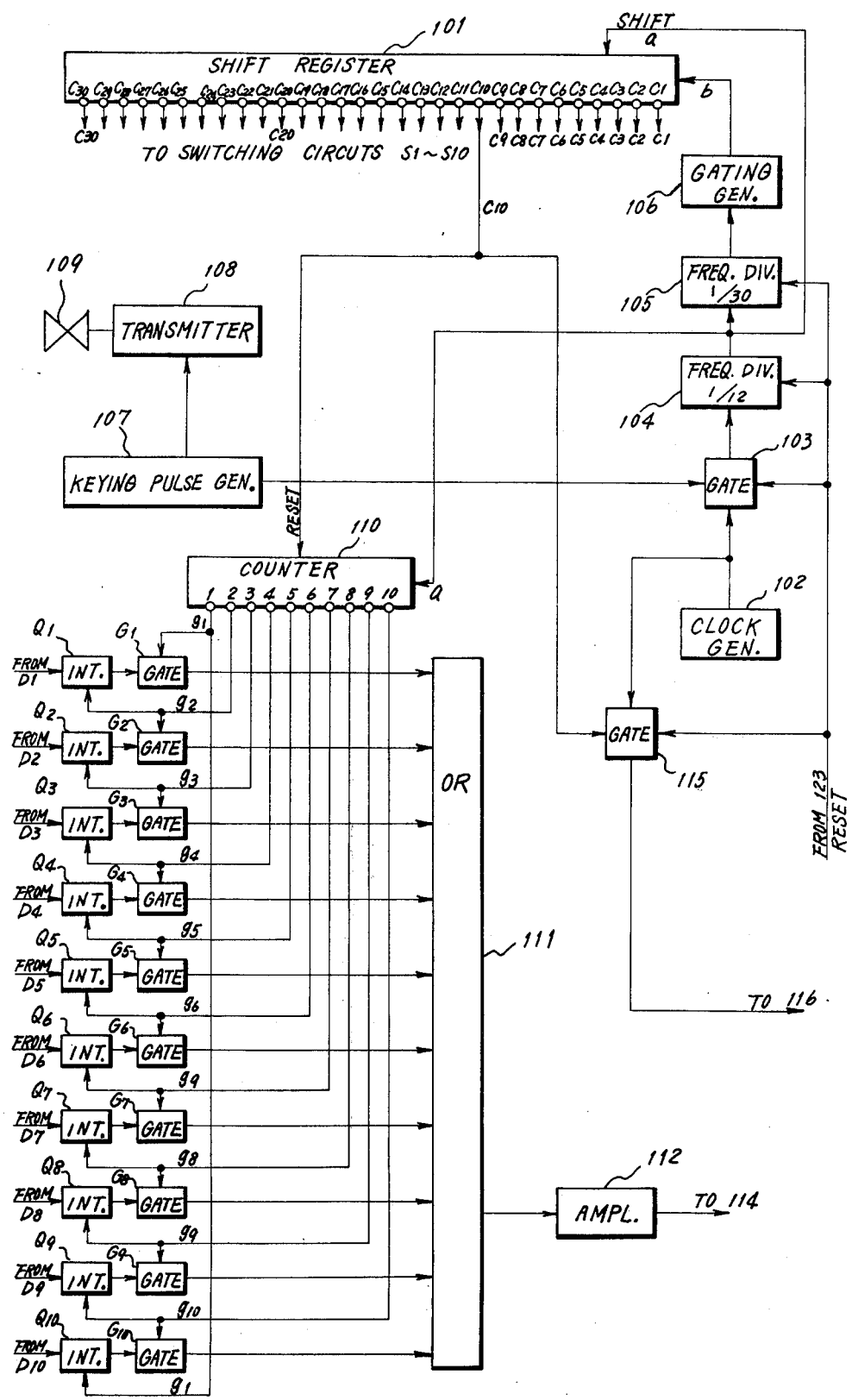

The control inputs of the switching circuits $S_1$, $S_2$, . . . $S_{10}$ are supplied from a shift register 101 (FIG. 3B).

The shift register has 30 bits and corresponding thirty parallel outputs $C_1$, $C_2$, . . . $C_{30}$ which are connected respectively to the control terminals $B_1$, $B_2$, . . . $B_{30}$ of the switching circuits $S_1$, $S_2$, . . . $S_{10}$. The shift input of the shift register 101 is supplied from a frequency divider 104 to which a clock pulse train is supplied from a clock pulse generator 102 through a gate circuit 103, and the serial input to be shifted in the shift register 101 is also supplied from the frequency divider 104 through another frequency divider 105 and a gating pulse generator 106.

The gating signal of the gate circuit 103 is supplied from a keying pulse generator 107. The keying pulse generator 107 also supplies an actuating signal to an ultrasonic wave transmitter 108 which is provided with a nondirective ultrasonic transmitting transducer 109.

The output of the frequency divider 104 is also connected to the input of a counter circuit 110 having 10 count outputs 1, 2, . . . 10 and a reset input connected, for example, to the parallel output $C_{10}$ of the shift register 101.

Returning to FIG. 3A, the outputs of the switching circuits $S_1$, $S_2$, . . . $S_{10}$ are connected to 10 delay circuits $D_1$, $D_2$, . . . $D_{10}$ which are of the same circuit configuration, as shown in FIG. 2, having six input terminals $P_1$, $P_2$, $P_3$, $P'_3$, $P'_2$, and $P'_1$ and an output terminal $P_0$, respectively. The outputs of the switching circuits $S_1$, $S_2$, . . . $S_{10}$ are connected to the delay circuits $D_1$, $D_2$, . . . $D_{10}$ in such fashion that the cyclicly adjoining six switching circuits are connected respectively to the input terminals $P_1$, $P_2$, $P_3$, $P'_3$, $P'_2$ and $P'_1$ of the respective delay circuits. More particularly, the outputs of the switching circuits $S_1$, $S_2$, $S_3$, $S_4$, $S_5$, and $S_6$ are connected respectively to the input terminals $P_1$, $P_2$, $P_3$, $P'_3$, $P'_2$ and $P'_1$ of the delay circuit $D_1$, the outputs of the switching circuits $S_2$, $S_3$, $S_4$, $S_5$, $S_6$ and $S_7$ are connected respectively to the same numbered input terminals of the delay circuit $D_2$, . . . the outputs of the switching circuits $S_6$, $S_7$, $S_8$, $S_9$, $S_{10}$ and $S_1$ are connected respectively to the same numbered input terminals of the delay circuit $D_6$, . . . and the outputs of the switching circuits $S_{10}$, $S_1$, $S_2$, $S_3$, $S_4$ and $S_5$ are connected respectively to the same numbered input terminals of the delay circuit $D_{10}$.

The outputs of the delay circuits $D_1$, $D_2$, . . . $D_{10}$ are respectively connected through integration circuits $Q_1$, $Q_2$, . . . $Q_{10}$ and gate circuits $G_1$, $G_2$, . . . $G_{10}$ to a common OR circuit 111. The integration circuits $Q_1$, $Q_2$, . . . have their own reset inputs connected respectively to the count outputs 2, 3, 4, . . . 10 and 1 of the counter circuit 110, while the gate circuits $G_1$, $G_2$, . . . $G_{10}$ have their own control inputs respectively connected to the count outputs 1, 2, . . . 9 and 10 of the counter circuit 110, as shown in FIG. 3B. The output of the OR circuit 111 is connected through an amplifier circuit 112 to the cathode electrode 114 of a cathode ray tube 113 (FIG. 3C).

Figure 3C:
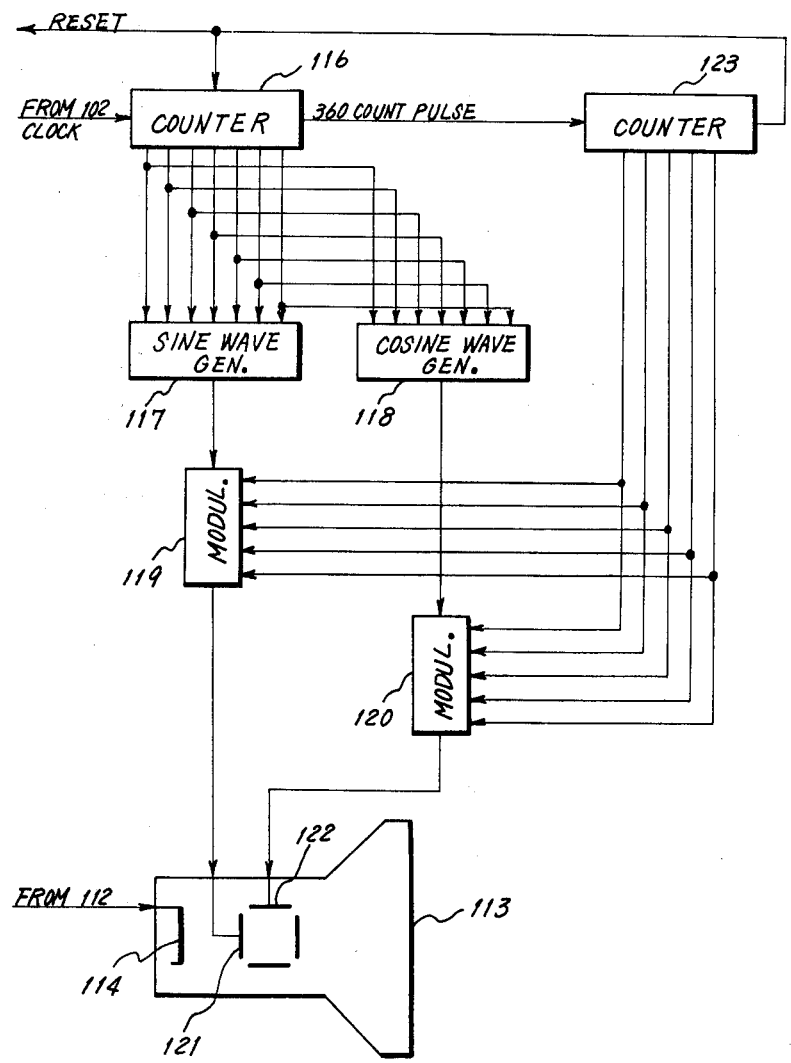

The output of the clock pulse generator 102 is also connected through a gate circuit 115, having a control terminal connected to the output $C_{10}$ of the shift register 101 and to a counter circuit 116 (FIG. 3C). The coded output of the counter circuit 116 is connected to a sine wave generator 117 and a cosine wave generator 118 which are respectively connected through amplitude modulators 119 and 120 to the horizontal deflection electrode 121 and the vertical deflection electrode 122 of the cathode ray tube 113. The counter circuit 116 also supplies an output pulse at every three hundred and sixth (360) counts to another counter circuit 123 whose coded output is connected to the modulators 119 and 120. The counter circuit 123 also generates a reset pulse at every predetermined count and its reset output is connected to the frequency dividers 104 and 105, the gate circuits 103 and 115 and the counter circuit 116.

Now, the operation of the system of this invention will be described with reference to the waveform diagram of FIG. 4.

In operation, the keying pulse generator 107 produces a keying pulse at every predetermined time. The keying pulse is supplied to the transmitter 108 as an actuating pulse to actuate it to drive the transmitting transducer 109 to emit an ultrasonic wave pulse in all directions. The ultrasonic wave pulse propagates in the medium such as water and is reflected back by objects to the receiving transducer $A_1, A_2, \ldots A_{30}$.

The keying pulse produced by the keying pulse generator 107 is applied to the gate circuit 103 as a gating pulse to open it. Thus, the clock pulse train produced by the clock pulse generator 102 is supplied to the frequency divider 104 in which the clock pulse train is frequency-divided by twelve (12) to become a clock pulse train a of period T, as shown in FIG. 4. This clock pulse train a is supplied to the shift register 101 as its shift input. The clock pulse train a is also supplied to the frequency divider 105 and frequency-divided again by thirty (30). The gating pulse generator 106 is controlled by the output of the frequency divider 105 to produce a gating pulse b having a duration equal to 10T and a period equal to 30T. As the pulse train b is shifted successively bit by bit by the shift pulse a in the shift register 101, the parallel outputs of the shift register 101 appear as shown by the waveforms $c_1, c_2, \ldots c_{30}$.

The gate circuits in the switching circuits $S_1, S_2, \ldots S_{10}$ are respectively controlled by the waveforms $c_1, c_2, \ldots c_{30}$ applied to the control terminals $B_1, B_2, \ldots B_{30}$, respectively. As shown in the drawing, the trailing edge of the waveform $c_1$ coincides with the leading edge of the waveform $c_{11}$, the trailing edge of the waveform $c_{11}$ coincides with the leading edge of the waveform $c_{21}$ and the trailing edge of the waveform $c_{21}$ coincides with the leading edge of the waveform $c_1$. Therefore, by the switching circuit $S_1$, the outputs of the transducers $A_1$, $A_{11}$ and $A_{21}$ are derived for a time period of 10T each in cyclicly alternating fashion. More specifically, the output of the transducer $A_1$ is first derived for a time period of 10T and, at the time of completion of this time period, derivation of the output of the transducer $A_{11}$ is initiated. Upon completion of the derivation of the output of $A_{11}$ for the time period of 10T, derivation of the output of $A_{21}$ is initiated and, at the completion of this derivation for the same time period, the second derivation of the output of $A_1$ is initiated. Switching of the outputs is effected in the same fashion in all switching circuits $S_1, S_2, \ldots S_{10}$.

In the time period between the leading edge and the trailing edge of the waveform $c_1$, it is understood that the switching circuits $S_1, S_2, \ldots S_{10}$ derive the outputs of the transducers $A_1, A_2, \ldots A_{10}$, respectively. Accordingly, the delay circuit $D_1$ combines the outputs of the transducers $A_1, A_2, A_3, A_4, A_5$ and $A_6$ as described previously in conjunction with the circuit of FIG. 2 to produce an output representative of the reflected ultrasonic wave signal coming back from the direction $\theta$ (FIG. 1). Similarly, the delay circuit $D_2$ combines the outputs of the transducers $A_2, A_3, A_4, A_5, A_6$, and $A_7$ to produce an output representative of the reflected signal from the direction $\theta_2$ and, quite similarly, the delay circuits $D_3, D_4$, and $D_5$ produce outputs respectively representative of the reflected signals from the directions $\theta_3, \theta_4,$ and $\theta_5$, though the outputs of the delay circuits $D_6$ through $D_{10}$ are meaningless during this time period.

When the waveform $c_{11}$ starts, however, the waveform $c_1$ ceases and the output of the transducer $A_1$ derived from the switching circuit $S_1$ is substituted for the output of the transducer $A_{11}$. Therefore, the output of the delay circuit $D_6$ becomes meaningful and representative of the reflected signal from the direction $\theta_6$. Similarly, when the waveforms $c_{12}, c_{13}, c_{14}$ and $c_{15}$ are successively applied to the switching circuits, the delay circuits $D_7, D_8, D_9$ and $D_{10}$ produce outputs successively representative of the reflected signals from the direction $\theta_7, \theta_8, \theta_9$ and $\theta_{10}$, respectively. It should be understood from the above description that the switching circuits $S_1, S_2, \ldots S_{10}$ derive successively the outputs of the transducers $A_1, A_2, \ldots A_{10}$ during the first round, those of the transducers $A_{11}, A_{12}, \ldots A_{20}$ during the second round and those of the transducers $A_{21}, A_{22}, \ldots A_{30}$ during the third round, and consequently the delay circuits $D_1, D_2, \ldots D_{10}$ produce successively thirty (30) outputs representative of the reflected signals from the thirty directions $\theta_1, \theta_2, \ldots \theta_{30}$ during these three rounds which form one cycle of the operation. These outputs are applied through the integration circuits $Q_1, Q_2, \ldots Q_{10}$ to the gate circuits $G_1, G_2, \ldots G_{10}$, respectively. The integration circuits serve a function of detecting and integrating the input signals in order to improve the signal to noise ratio.

Figure 4:
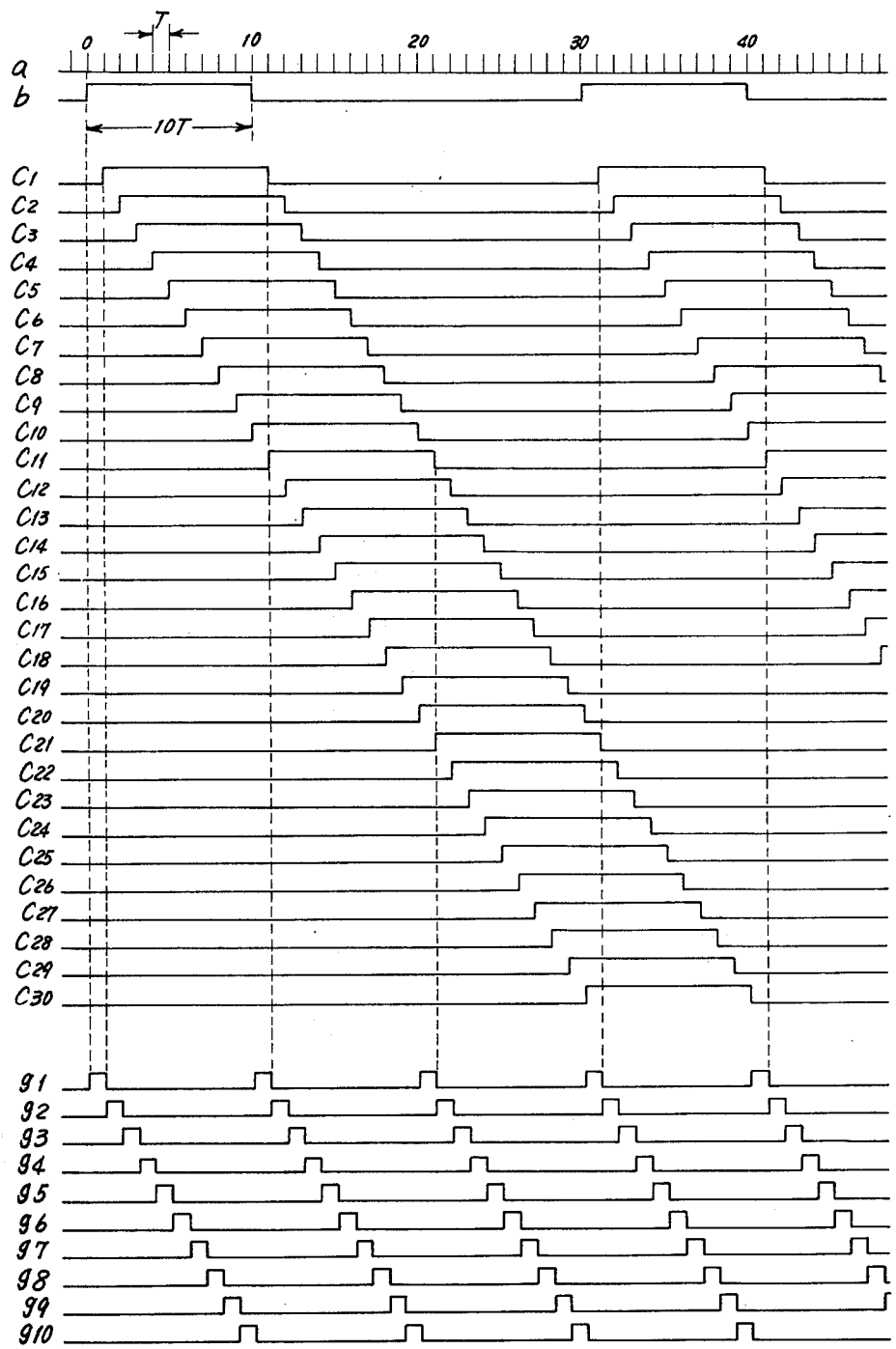
FIG. 4 is a waveform diagram representing various waveforms appearing in the circuit of FIGS. 3A through 3C.

The counter circuit 110 (FIG. 3B) counts the clock pulse train a supplied from the frequency divider 104 and produces ten (10) output pulses $g_1, g_2, \ldots g_{10}$, as shown in FIG. 4, successively from its output terminals 1, 2, ... 10. As the clock pulse train a counted by the counter circuit 110 is identical to the shift pulse train of the shift register 101 which controls the operation of the switching circuits $S_1, S_2, \ldots S_{10}$, switching of the inputs to the integration circuits $Q_1, Q_2, \ldots Q_{10}$ and consequently to the gate circuits $G_1, G_2, \ldots G_{10}$ are completely synchronized with the outputs of the counter circuit 110. In this embodiment, moreover, the counter circuit 110 is reset by the leading edge of the gating pulse $c_{10}$. Accordingly, the trailing edge of the output pulse $g_1$ produced at the output 1 of the counter circuit 110 just after the resetting becomes coincident with the trailing edge of the gating pulse $c_1$, as shown in FIG. 4. This output pulse $g_1$ is applied to the gate circuit $G_1$ to drive it into conduction to pass the output of the delay circuit $D_1$ stored in the integration circuit $Q_1$. After one period T of the clock pulse pulse train a, the output pulse $g_1$ ceases to close the gate circuit $G_1$ and, at the same time, the output pulse $g_2$ appears at the output 2 of the counter circuit 110. This output pulse $g_2$ is applied to the integration circuit $Q_1$ to initiate the next storage and, at the same time, to the gate circuit $G_2$ to drive it into conduction to pass the output of the delay circuit $D_2$ stored in the integration circuit $Q_2$. Thus, the input to the OR circuit 111 is switched from the output of the delay circuit $D_1$ to that of the delay circuit $D_2$. According to the same mode of operation, the gate circuits $G_1, G_2, \ldots G_{10}$ are sequentially driven into conduction one at a time and the operation is repeated cyclicly. Since, as described previously, the signals representative of the reflected signals from the directions $\theta_1, \theta_2, \ldots \theta_{10}$ are cyclicly supplied from the delay circuits $D_1, D_2, \ldots D_{10}$ through the integration circuits $Q_1, Q_2, \ldots Q_{10}$ to the gate circuits $G_1, G_2, \ldots G_{10}$ denoting the above mentioned three rounds, the OR circuit 111 outputs these signals sequentially one at a time and they are sequentially applied through the amplifier 112 to the cathode 114 of the cathode ray tube 113 to modulate the brightness of the displayed image.

The leading edge of the gating pulse $c_{10}$ from the shift register 101 opens the gate circuit 115 (FIG. 3B) to supply the clock pulse train from the clock pulse generator 102 to the counter circuit 116. The counter circuit 116 counts the clock pulses and supplies the coded count output successively to the sine wave generator 117 and the cosine wave generator 118. The sine wave generator 117 and the cosine wave generator 118 produce respectively a sine wave signal and a cosine wave signal based upon the same coded output and, therefore, form a circular scan line on the cathode ray tube 113 through the horizontal and vertical deflection electrodes 121 and 122. In this case, the system is arranged so that 360 counts of the counter circuit 116 corresponds to one complete circular scan. As the switching of the transducers $A_1, A_2, \ldots A_{30}$ is controlled by the clock pulse train a having a frequency equal to 1/12 of the clock pulse train supplied to the counter circuit 116, one circular scan on the cathode ray tube 113 corresponds to the thirty transducers $A_1, A_2, \ldots A_{30}$ or the thirty directions $\theta_1, \theta_2, \ldots \theta_{30}$. Accordingly, if there is any signal derived from the OR circuit 111, which is representative of the reflected signal from a specific direction, a bright spot is formed on the circular scan line in the angular direction corresponding to said specific direction.

As described previously, the counter circuit 116 also produces an output pulse at every 360 counts of the clock pulses, that is at the end of each circular scan. The counter 123 counts this output pulse and supplies the coded count output successively to the amplitude modulators 119 and 120. With increase of the count output of the counter circuit 123, the amplitudes of the sine wave and cosine wave from the generators 117 and 118 are increased by the modulators 119 and 120. This results in increase of the diameter of the circular scan line on the cathode ray tube 113 and consequent complete scan throughout the screen. When the count of the counter circuit 123 reaches a specific value corresponding to a predetermined radius of the display screen, the counter circuit 123 produces a reset pulse which is applied to the counter circuit 116 to restore the original condition for again starting the circular scan from the center of the screen. By cooperation of this circular scan with the sequential application of the composite outputs of the delay circuits $D_1, D_2, \ldots D_{10}$ to the cathode ray tube 114, the object to be detected is imaged on the display screen at a position corresponding in direction and distance to the practical one.

The reset pulse from the counter circuit 123 is also applied to the frequency dividers 104 and 105 and the gate circuits 103 and 115 to reset these circuits to restore the original condition of the system. Then, the system is a gain actuated by the keying pulse from the keying pulse generator 107 as described previously and the same operation is repeated.

As described above, only 10 sets of switching and delay circuits are required for 30 ultrasonic transducers in this inventive system, while thirty sets were needed for the same number of transducers in the prior art system. Furthermore, it will be understood that, if each switching circuit is arranged to switch five incoming signals, only six similar sets are theoretically enough to obtain the same operation when the outputs of six transducers are combined to form a directive reception signal. However, the four extra sets in this embodiment serve an important function, as follows, which is peculiar to the system of this invention.

More specifically, in the case of a six set configuration, the outputs of six switching circuits applied to a specific delay circuit must be composed therein and an output therefrom produced after one period T of the clock pulse train a. However, due to relatively large time lag in ultrasonic transmission, this results in a requirement for a relatively long period of the clock pulse train a such as 200 microseconds as described previously and consequent long scanning time as required in the prior art. In the present ten set configuration, however, each delay circuit has a time corresponding to four periods 4T of the clock pulse train a from reception of its six inputs to delivery of its composite output. Adding the gating time of each gate circuit, the time which can be used in each delay circuit for composing its directive output becomes as long as five periods 5T of the clock pulse train a. When the time required for composing each directive output is 200 microseconds, for example, as illustrated above, the least period of the clock pulse train a required for this operation is only 40 microseconds. Accordingly, the necessary scanning time for one cycle which corresponds to one round of the thirty transducers $A_1, A_2, \ldots A_{30}$ is 1200 microseconds. As an ultrasonic wave propagates 180 centimeters for 1200 microseconds, the distance difference included in each reflected wave, that is, the ineffective interval of the system is only 90 centimeters. This distance is sufficiently neglegible in consideration of the distance resolution of the detecting pulse. As described above, in the system of this invention, the switching speed of the received signals can be made so high that high accuracy of indication is obtainable even in a short distance.

In addition, as understood from the above description, the receiving transducers corresponding to each delay circuit are switched well before the conduction of the corresponding gate circuit $G_1, G_2, \ldots$ or $G_{10}$. Accordingly, there is no chance of sending any noise due to the switching pulse out of each gate circuit.

In this system, moreover, each composite directive output of the delay circuit is once stored in the corresponding integration circuit before it is sent out through the corresponding gate circuit. This results in a very high signal-to-noise noise ratio as compared with the case of deriving the instantaneous value of the composite signal.

Although the above description has been made in conjunction with the case in which the number $(m \times n)$ of ultrasonic transducers is 30, the number $(n)$ of switching or delay circuits is 10 and the number $(k)$ of ultrasonic transducers corresponding to one switching or delay circuit is 6, these numbers can be changed arbitrarily. For instance, the number $k$ can be increased up to the number $n$ without leaving the range of this invention. However, some advantages of this invention such as high switching speed and noise immunity are lost as the number $k$ approaches the number $n$. Therefore, when the number $k$ of transducers is increased for improving the directivity of received signal, it is desirable to correspondingly increase the number $n$ of delay circuits. As described above, the time margin for deriving the composite signal from the delay circuit is a four period interval of the clock pulse train a in the above embodiment. Accordingly, in order to increase the number $k$ without loss of advantage, the number $n$ is also increased so that the difference $n - k$ is always 4 or more. The greater this difference becomes, the higher the resultant switching speed is obtained. The number of switching circuits $S_1, S_2, \ldots$ must be always equal to the number of delay circuits $D_1, D_2 \ldots$ and increase in the number of delay circuits, however, induces reduction of another advantage of this invention such as simplicity and compactness of the device, though it improves the switching speed. Therefore, these numbers must be preferably selected in consideration of use of the system.

Although, in the above embodiment, the parallel output $c_{10}$ of the shift register 101 is used for resetting the counter circuit 110, this relates merely to zero point determination of the circular scan on the cathode ray tube. Therefore, the same operation can be obtained by using any parallel output of the shift register 101 instead of the output $c_{10}$.

What is claimed is:

1. An ultrasonic detection system, comprising means for emitting an ultrasonic wave signal in all peripheral directions, a plurality of ultrasonic transducers arranged circularly at equal intervals for receiving said ultrasonic wave signals reflected back from said directions, a plurality of composite output circuits for combining the outputs of $k$ ($k > 1$) transducers which are successively adjoining in a predetermined circumferential direction to produce a plurality of directive composite outputs, and means for deriving said composite outputs sequentially in time division fashion for indications; said ultrasonic transducers being classified into $m$ groups each consisting of $n$ transducers which are successively adjoining in said circumferential direction, the number of said composite output circuits being designated as $n$, where m and $n$ are integers greater than one and $n$ is equal to or greater than $k$, $n$ switching circuits each having m inputs connected respectively to the outputs of the j-th ($j = 1, 2, \ldots n$) transducers of said m groups of transducers, said switching circuits being connected to said composite output circuits such that n sequential combinations of switching circuits each consisting of k switching circuits which are circulatingly adjoining in said circumferential direction are coupled sequentially to said composite output circuits, and control means for deriving $n$ outputs at a time from said switching circuits which are circulatingly adjoining in said circumferential direction and, at the same time, shifting said n outputs one by one in said circumferential direction.

2. An ultrasonic detection system, according to claim 1 wherein each of said switching circuits includes $m$ gate circuits for controlling respectively said $m$ inputs, said control means comprises a shift register having a plurality of parallel outputs, the number of which corresponds to the number of said ultrasonic transducers, means for supplying a control pulse having a duration corresponding to the shift time of $n$ transducers to the serial input of said shift register and means for supplying a clock pulse train synchronized with the shift of said transducers to the shift input of said shift register, and said parallel outputs of said shift register are connected sequentially to the control inputs of said gate circuits in said switching circuits which respectively correspond to said transducers in said circumferential direction.

3. An ultrasonic detection system, according to claim 1 wherein the number $k$ of the transducer outputs to be combined by each composite output circuit is made less than the number of said composite output circuits, and a storage circuit is connected to the output of said each composite output circuit.

* * * * *